US009245332B2

(12) United States Patent
Matthews (10) Patent No.: US 9,245,332 B2
(45) Date of Patent: Jan. 26, 2016

(54) METHOD AND APPARATUS FOR IMAGE PRODUCTION (75) Inventor: Kim N. Matthews, Warren, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 596 days.

(21) Appl. No.: 13/043,625

(22) Filed: Mar. 9, 2011

(65) Prior Publication Data
US 2012/0229650 A1 Sep. 13, 2012

(51) Int. Cl.
H04N 5/33 (2006.01)
G06T 5/50 (2006.01)
G06K 9/62 (2006.01)
H04N 5/232 (2006.01)
H04N 5/235 (2006.01)

(52) U.S. Cl.
CPC .............. G06T 5/50 (2013.01); G06K 9/6289 (2013.01); G06T 2207/10024 (2013.01); G06T 2207/10048 (2013.01); G06T 2207/20221 (2013.01); H04N 5/2354 (2013.01); H04N 5/23232 (2013.01); H04N 5/332 (2013.01)

(58) Field of Classification Search
CPC .. H04N 5/23232; H04N 5/2354; H04N 5/332
USPC ........................................................ 348/164
See application file for complete search history.

(56) References Cited

U.S. PATENT DOCUMENTS

| 8,169,518 | B2 * | 5/2012 | Ota | 348/294 |
| 2002/0140822 | A1 * | 10/2002 | Kahn et al. | 348/207.99 |
| 2003/0093805 | A1 * | 5/2003 | Gin | 725/105 |
| 2004/0196371 | A1 * | 10/2004 | Kono et al. | 348/162 |
| 2008/0079807 | A1 * | 4/2008 | Inuiya et al. | 348/70 |
| 2009/0050806 | A1 * | 2/2009 | Schmidt et al. | 250/332 |
| 2009/0294666 | A1 * | 12/2009 | Hargel | 250/330 |
| 2010/0309315 | A1 * | 12/2010 | Hogasten et al. | 348/164 |
| 2011/0228096 | A1 * | 9/2011 | Friel et al. | 348/164 |
| 2011/0262053 | A1 * | 10/2011 | Strandemar | 382/263 |
| 2012/0147194 | A1 * | 6/2012 | Wang et al. | 348/164 |

FOREIGN PATENT DOCUMENTS

WO PCT/US2012/025847 6/2012

OTHER PUBLICATIONS

Zhuo et al,"Enhancing low light images using near infrared flash images," IEEE 17th International conference on image processing, Sep. 26-29, 2010, pp. 2537-2540.*
JAI 2-CCD progressive area scan camera: AD-080GE datasheet, 3 pgs.
Kinect Wikipedia Entry, pp. 1-15.
Axis Communications: CCD and CMOS sensor technology: Technical White Paper, 8 pgs.
Joe Mailer: FXScript Reference: RGB and YUV Color (http://joemallercom/fcp/fxscript_yuv_color.shtml), 5 pgs.

(Continued)

Primary Examiner — Richard Torrente
(74) Attorney, Agent, or Firm — C. Bilicska (57) ABSTRACT An improved lighting technique via a lighting technique utilizing a light source invisible to the subject is provided herein. The improved lighting technique capability blends image data from an image detector sensitive to visible light with corresponding image data from an image detector sensitive to light not visible to humans to create an improved image.

19 Claims, 9 Drawing Sheets (56) References Cited

OTHER PUBLICATIONS

JAI Camera Selection Guide, www.jai.com, 8 pgs.
Shaojie Zhuo et al: "Enhancing low light images using near infrared flash images", 2010 17th IEEE International Conference on Image Processing: (ICIP 2010); Hong Kong, Sep. 26-29, 2010, IEEE, Piscataway, NJ, USA, Sep. 26, 2010, pp. 2537-2540, XP031814291, ISBN: 978-1-4244-7992-4 abstract; figure 2 sections 1 and 3.
Sosuke Matsui et al: "Image Enhancement of Low-Light Scenes with Near-Infrared Flash Images", Sep. 23, 2009, Lecture Notes in Computer Science, Springer, DE, pp. 213-223, XP019141340, ISBN: 978-3-642-12306-1 abstract; figures 1, 4 sections 1, 3 and 4.
Fredembach C et al: "Colouring the near-infrared", Final Program and Proceedings; IS and T/SID Color Imaging Conference (16th Color Imaging Conference: Color Science and Engineering Systems, Technologies, and Applications; Nov. 10-15, 2008, Portland, Oregon, US, Nov. 10, 2008, pp. 176-182, XP009134437, ISBN: 978-0-89208-281-0 abstract pp. 179-180.
Andrea Guidi et al: "GUI-aided NIR and color image blending", MELECON 2010—2010 15th IEEE Mediterranean Electrotechnical Conference, IEEE, Piscataway, NJ, USA, Apr. 26, 2010, pp. 1111-1116, XP031683677, ISBN: 978-1-4244-5793-9 abstract sections II and III.
Xiaopeng Zhang et al: "Enhancing photographs with Near Infra-Red images", Computer Vision and Pattern Recognition, 2008. IEEE Conference on, IEEE, Piscataway, NJ, USA, Jun. 23, 2008, pp. 1-8, XP031297383, ISBN: 978-1-4244-2242-5 abstract section 3.

* cited by examiner

METHOD AND APPARATUS FOR IMAGE PRODUCTION

TECHNICAL FIELD

The invention relates generally to methods and apparatus for image production.

BACKGROUND

This section introduces aspects that may be helpful in facilitating a better understanding of the inventions. Accordingly, the statements of this section are to be read in this light and are not to be understood as admissions about what is in the prior art or what is not in the prior art.

There are numerous techniques for lighting an object for image capture. For example, one technique relies on visible environmental lighting (e.g., existing ceiling lights, ambient lighting, and/or the sun). Another technique uses front visible auxiliary lighting (e.g., floodlights and flashlights) of a subject, e.g., to illuminate a subject's face.

SUMMARY

Various embodiments may provide improved lighting techniques by utilizing an auxiliary light source that is invisible to the subject. For example, some such embodiments may reduce the shadows resulting from obstruction of visible environmental light (e.g., shadows of the brow-line across the eyes, the nose across the month and/or the chin on the chest). In addition, these embodiments can provide for more pleasant lighting environments to subjects compared to lighting environments produced by visible auxiliary lighting, because the subject is not aware of invisible light. Indeed, invisible lighting is also typically less likely to cause squinting and discomfort than auxiliary lighting that frontally illuminates a subject's face with visible lighting. Thus, such embodiments provide a lighting technique that may eliminate shadows caused by obstruction of the environmental lighting without causing discomfort to the subject.

Various embodiments process an image produced with light visible to humans with a corresponding image produced with light not visible to humans to create an improved image. For example, one or more of the pixels of the image produced with visible light may be modified as a function of intensity information representing corresponding pixel(s) of the image produced with invisible or IR light to create a new RGB value for that pixel of the image.

In some embodiments of the apparatus, an image blender includes digital data storage and a processor configured to blend one or more pixels of a visible light image with one or more pixels from corresponding locations of an invisible light image to create a new image.

In some embodiments of the apparatus, the color pixel data of the visible light image includes first chrominance data and first intensity data, the intensity pixel data of the invisible light image includes second intensity data, and new pixel data of the blended new image includes second chrominance data based on the first chrominance data and the third intensity data based on the second intensity data.

In some embodiments, the first chrominance data and the first intensity data are mixed in the color pixel data of the visible light image.

In some embodiments, the color pixel data of the visible light image is an additive color model.

In some embodiments, the blending of the color pixel data and the intensity pixel data uses a blending function to form a new target color. The blending function includes the second intensity value, a target color from the color pixel data, and at least one other color from the color pixel data.

In some embodiments, the blending function is $r'=i*r/(r+g+b)$, wherein $r'$ is a data value defining the new target color, $r$ is a data value defining the target color, $g$ and $b$ are data values defining the at least one other color, and $i$ is a data value defining the second intensity value.

In some embodiments, the act of blending produces the third intensity data based on the first intensity data and the second intensity data.

In some embodiments, the act of blending produces the third intensity data based on mixing the first intensity data and the second intensity data according to a mixing value alpha.

In some embodiments, the color pixel data is based on an additive color model and the act of blending includes using $R=alpha*r+(1-alpha)*r'$, wherein $R$ is a data value defining a new target color, the new target color includes the blended third intensity data, $r$ is a data value defining a target color, the target color includes the blended first intensity data, $r'$ is a data value defining an intensity blended target color, the intensity blended target color includes the blended second intensity data, and alpha is a data value defining the mixing value alpha.

In some embodiments, the act of blending includes using $Y=alpha*y+(1-alpha)*y'$, wherein $Y$ is a data value defining the third intensity data, $y$ is a data value defining the first intensity data, $y'$ is a data value defining the second intensity data, and alpha is a data value defining the mixing value alpha.

In another embodiment of the apparatus, an image handler includes a pixilated visible light image detector configured to record color pixel data for a plurality of pixels representing a visible light image of a scene from visible light received from the scene; a pixilated invisible light image detector configured to record intensity pixel data for a plurality of pixels representing an invisible light image of the scene from invisible light received from the scene; and an image blender configured to digitally produce new pixel data for a plurality of pixels representing a new image of the scene by blending the color pixel data from at least one of the plurality of pixels representing the visible light image and the intensity pixel data from a corresponding location of the invisible light image.

In some embodiments, the apparatus further includes an invisible light source that produces invisible light at a wavelength to which the pixilated invisible light image detector is sensitive.

In some embodiments, the apparatus invisible light source produces invisible light at an infrared or near infrared wavelength.

In some embodiments, the pixilated visible light image detector and the pixilated invisible light image detector have different numbers of pixels.

In some embodiments, the apparatus further includes a processor configured to perform at least one of: activating the invisible light source; deactivating the invisible light source; positionally adjusting the invisible light source; and configuring the invisible light source.

In some embodiments, the invisible light source includes a first invisible light source having a first wavelength and a second invisible light source having a second wavelength.

In another embodiment, a method is provided for blending visible light images and invisible light images. The method includes retrieving from a digital data storage color pixel data for a pixel of the visible light image and intensity pixel data for a pixel of a corresponding location of the invisible light image. The method further includes blending the color pixel data and the intensity pixel data to form new pixel data.

In some embodiments of the method, the color pixel data includes first chrominance data and first intensity data; the intensity pixel data includes second intensity data; and the new pixel data includes second chrominance data and third intensity data. The act of blending produces the second chrominance data based on the first chrominance data and the third intensity data based on the second intensity data.

In some embodiments of the method, the act of blending produces the third intensity data based on the first intensity data and the second intensity data.

In some embodiments, the method includes storing the new pixel data in the digital data storage.

In some embodiments of the method, the act of blending produces the third intensity data based on mixing the first intensity data and the second intensity data according to a mixing value alpha.

In some embodiments of the method, the mixing value alpha is based on at least one of: a configuration parameter; a location of the color pixel data; and a comparison between the first intensity data and the second intensity data.

In some embodiments, the method further includes saving at least one of the first intensity data, the second intensity data, and/or the third intensity data in a history and basing the mixing value alpha on the history.

In some embodiments, the method further includes forming the color pixel data and the intensity pixel data by recording the visible light image of the scene in a first array-type light detector and by recording the invisible light image of the scene in a second array-type light detector.

BRIEF DESCRIPTION OF THE DRAWINGS

Various embodiments are illustrated in the accompanying drawings, in which.

To facilitate understanding, identical reference numerals have been used, in some cases, to designate elements having substantially the same or similar structure and/or substantially the same or similar function.

DETAILED DESCRIPTION OF ILLUSTRATIVE EMBODIMENTS

Figure 1:
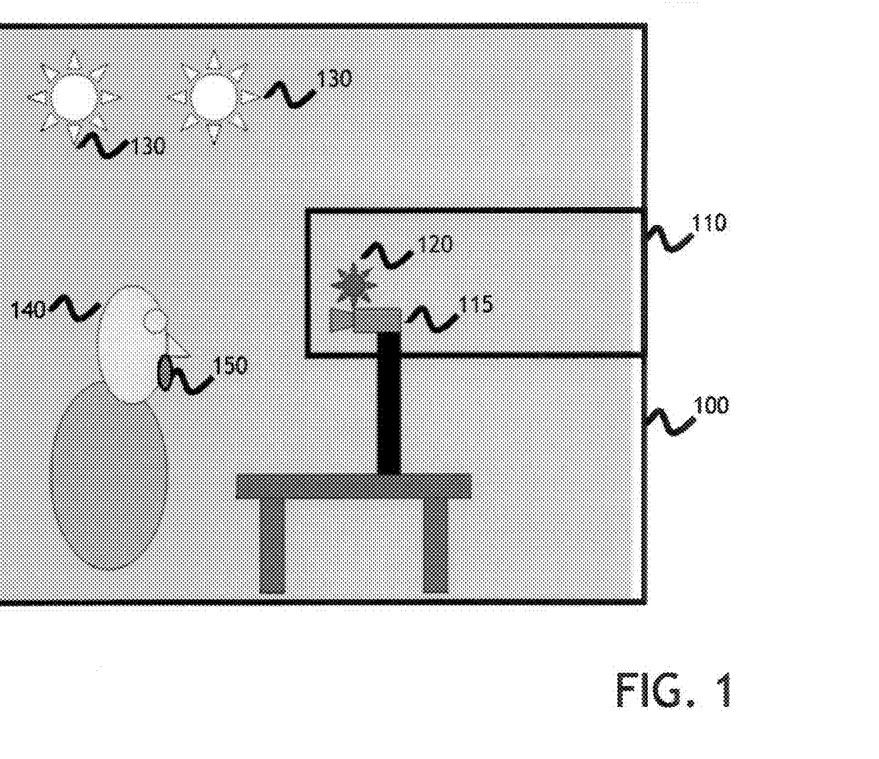
FIG. 1 illustrates an exemplary image capture system.

FIG. 1 illustrates an exemplary image capture system 100 that includes camera 110. Camera 110 includes an image capture device 115 and light source 120 that generates light at a wavelength not visible to the human eye, e.g., infrared, near infrared or ultraviolet light. Herein, light invisible to the human eye is referred to as invisible light, e.g., light at infrared or near infrared wavelengths. The image capture system 100 may be operated to image a scene, e.g., in which the scene-being-imaged 140 is subjected to environmental visible light from the external light source 130, e.g., the sun or room lights. During the capture of an image, obstruction of the external light source 130 may produce one or more undesirable shadow areas 150 on subject(s) and/or object(s) of the scene-being-imaged.

The image capture system 100 may include any imaging system for digitally capturing images with light reflected from and/or emitted by the scene-being-imaged. Examples of such imaging systems include a video conferencing system or online chat system (e.g., located in a PC, a mobile device, or an enterprise video conference system), an individual picture captures system (e.g., a camera), a video capture system (e.g., a camcorder), and the like.

The image capture device 115 is configured to record visible light image(s) of the scene-being-imaged and invisible light image(s) of the same scene-being-imaged. The image capture device 115 is also configured to produce a new image of the scene-being-imaged, e.g., an improved image, by effectively blending, in a pixel-by-pixel manner, corresponding portions of the recorded visible light and invisible light images.

In the system 100, the light source 120 provides illumination of the scene-being-imaged with invisible light. Since the light source 120 illuminates with invisible light, a human subject for imaging by the camera 110 will not react due to illumination by the light source 120, e.g., will not squint or blink in response to such illumination.

In FIG. 1, shadow area 150 may be formed by partial obstruction of environmental light from the external light source(s) 130, e.g., a ceiling light and/or the sun. For example, such obstruction of environmental lighting may cause shadows to be drawn by the brow-line across the eyes, by the nose across the month, by the chin down the chest, and/or by any object interfering with the environmental illumination of another object in the scene-being-imaged.

In contrast the external light sources(s) 130, the light source 120 will typically not produce such undesired shadows, because the scene-being-imaged is frontally illuminated by the light source 120. Nevertheless, the light source 120 may still have various positions with respect to the image capture device 115 and not produce such undesired shadows. In the different embodiments, the light source 120 may be or may not be attached to the image capture device 120.

Figure 2:
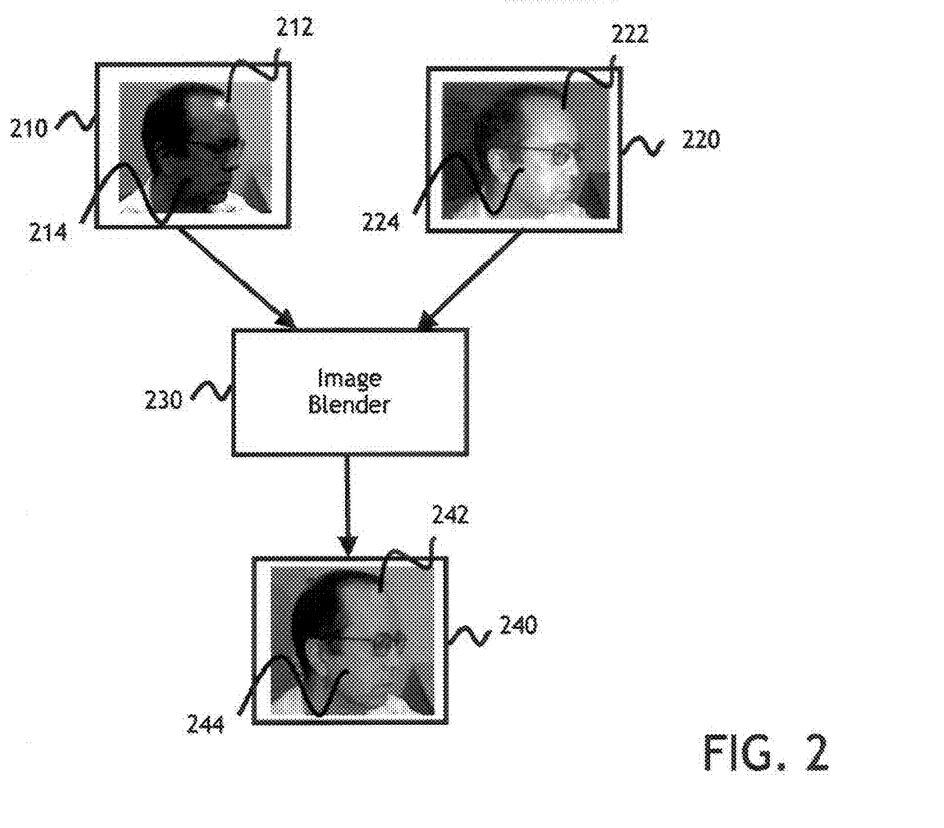
FIG. 2 depicts a block diagram schematically illustrating an image blender of the camera of FIG. 1.
Figure 3:
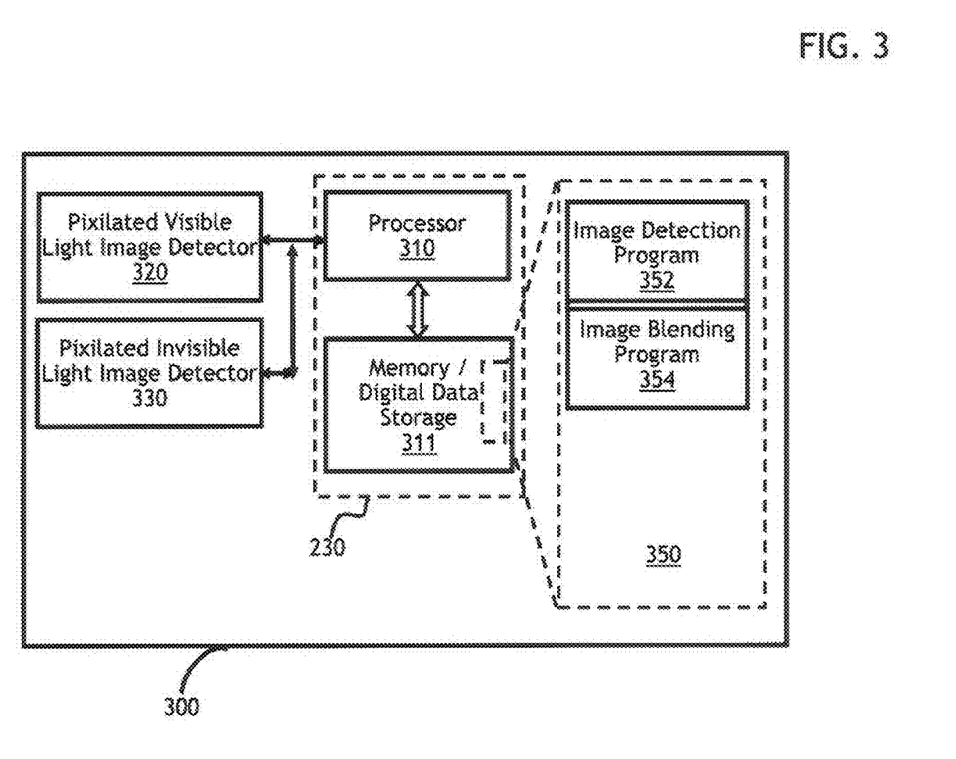
FIG. 3 depicts a block diagram schematically illustrating an image handler that includes the image blender of FIG. 2.

FIG. 2 schematically illustrates functional blocks of an image blender 230 of the image handler 300 of FIG. 3. The image blender 230 blends the recorded visible light image 210, e.g., a multi-color image or a black and white image, with a corresponding recorded invisible light image 220, e.g., an intensity image, to create new image 240, e.g., an improved color image of the scene-being-imaged.

The received and recorded visible light image 210 may be an array of color and/or intensity values at the pixels of a pixilated 2D imaging array in the image handler 300, e.g., pixilated visible light image detector 320. The visible light image 210 is formed from visible light received from the scene-being-imaged. The visible light image 210 may include one or more undesirable hot spot areas 212, which are caused by glare of the visible lighting and/or may include one or more undesirable shadow areas 214, which are caused by obstruction of the environmental visible lighting.

The received and recorded invisible light image 220 may be an array of intensity values at the pixels of a second pixilated 2D imaging array in the image handler 300, e.g., pixilated invisible light image detector 330. The invisible light image 220 is formed from received invisible light, i.e., at the wavelength of the light source 120 of FIG. 1. As illustrated in FIG. 2, since invisible light may be incident from a different direction than visible light, areas 222 and 224 of invisible light image 220 may not exhibit the same undesired glare and shadow affects as seen in areas 212 and 214 of the visible light image 210.

Image blender 230 digitally creates a new image 240 by blending, on a pixel-by-pixel basis, the pixel information of visible light image 210 with the corresponding pixel information of invisible light image 220. As illustrated, the resulting blended areas 242 and 244 of the new image 240 may be advantageously improved over corresponding areas 212 and 214 of the original visible light image 210. For example, the undesired glare and/or shadowing effects may be reduced in the new image.

FIG. 3 schematically illustrates one embodiment of an image handler 300 of the camera of FIG. 1. The image handler 300 includes a pixilated visible light image detector 320, a pixilated invisible light image detector 330, a processor 310, and a digital data storage 311. In the image handler 300, the processor 310 and digital data storage 311 function as the image blender 230 of FIG. 2.

As referred to herein, a color pixel is a pixel of the digital color image captured by an image detector sensitive to visible light (e.g., pixilated visible light detector 320) and color pixel data is the pixel data (e.g., RGB values) for the color pixel therefrom. Moreover, as referred to herein, an intensity pixel is a pixel of the digital intensity image captured by an image detector sensitive to invisible light (e.g., pixilated invisible light detector 330) and intensity pixel data is the pixel data (e.g., intensity value) for the intensity pixel therefrom.

The pixilated visible light image detector 320 has a 2D array of pixels that sense visible light from the scene-being-imaged. Each pixel enregisters color values, e.g. intensities of red, green, and blue light, or a light intensity for the visible light received at that pixel.

The pixilated invisible light image detector 330 has a second 2D array of pixels that sense invisible light from the scene-being-imaged. Each pixel enregisters an intensity of the invisible light received at that pixel.

In various embodiments, the pixilated visible and invisible light detectors 320 and 330 may be co-located in separate physical devices or in the same physical device (e.g., an integrated CCD). It may be appreciated that color pixel data and intensity pixel data may be stored separately or in one pixel location (e.g., an "RGBI" color model which combines RGB visible pixel data with "I" invisible light pixel data).

The processor 310 controls the operation of image handler 300. The processor 310 cooperates with the digital data storage 311, pixilated visible light image detector 320, and pixilated invisible light image detector 330.

The digital data storage 311 stores digital image data and programs 350 executable by the processor 310.

In the digital data storage 311, the stored digital image data may include image data for the visible and invisible images 210, 220, which are detected by the pixilated image detectors 320, 330 and image data for the new image 240 produced by the image blender 230 of FIG. 2. For the visible light image 210, the image data may include color pixel data for each individual pixel of the pixilated image detector 320. For the invisible light image 220, the image data may include intensity pixel data, e.g., data for the intensity of invisible light at each individual pixel of the pixilated image detector 330. For the new image 240, the image data may include improved new pixel data, e.g., the adjusted intensities of red, green, and blue light for each separate pixel of the pixilated image detector 320.

The color pixel data may include any suitable information to represent the color of the corresponding pixel of the captured visible light image, e.g., in any model for capturing chrominance (hue and saturation) and intensity data. For example, at an individual pixel, the visible light pixel data may be defined by the conventional RGB, YUV, Quattron, CMYK, HSL (i.e., hue, saturation and lightness), HSV (i.e., hue, saturation and value), or HSI (hue, saturation and intensity) color models.

The intensity pixel data may include any suitable information to represent the corresponding pixel of the captured invisible light image, e.g., in any model for capturing the intensity of the invisible light.

The processor-executable programs 350 may include programs for an image detection program 352 and for an image blending program 354. Processor 310 cooperates with digital data storage 311, e.g., to execute the image detection program 352 to collect image data from the two pixilated image detectors 320, 330 and to execute the image blending program 354 to blend such image data to produce data for a new pixilated image, e.g., to blend the visible and invisible light images 210 and 220 to produce the new image 240 of FIG. 2.

Processor 310 in cooperation with digital data storage 311 executes the image blending program 354 to blend image data from pixilated visible image detector 320 and image data for corresponding pixels from pixilated invisible image detector 330 to form data for the new image. For example, color pixel data from the pixilated visible light image detector 320 and corresponding intensity pixel data from the pixilated invisible light image detector 330 correspond when the data represents the same physical location in the scene-being-imaged. In some embodiments, the image blending program 354 and associated programming logic may be implemented in a hardware component such as an ASIC, CCD, DSP, FPGA or any suitable hardware device.

In some embodiments, pixilated visible light image detector 320 and pixilated invisible light image detector 330 may capture visible and invisible light from the scene-being-imaged through the same optical path to facilitate corresponding pixel information. Then, the pixilated visible light image detector 320 includes a first optical filter that blocks invisible light and that substantially transmits visible light, and the pixilated invisible light image detector 330 includes a different second optical filter that blocks visible light and that substantially transmits invisible light. In such embodiments, light received from the scene-being-imaged via the above-mentioned optical path may be power split so that one portion is directed towards the pixilated visible light image detector 320 to produce an image thereon with visible light and a remaining portion is directed to the pixilated invisible light image detector 330 to produce an image thereon with invisible light. In other embodiments, the two pixilated image detectors 320, 330 may not capture images of the scene-being-imaged through the same optical path or may capture images through different zoom ratios. In such embodiments, pattern matching may be used to create reference point(s) linking the physical locations of the scene-being-imaged in the captured visible light and invisible light images.

In some embodiments, the two pixilated image detectors 320, 330 may not take identical pixelations of the visible and invisible light images. In such embodiments, a numerical location correspondence between pixel location (e.g., x, y location) of the visible and invisible light images may be used to identify a corresponding pixel of the invisible light image to each pixel of the visible light image. For example, if the pixilated visible light image detector 320 captures visible images in a 1600×1200 pixel array, and the pixilated invisible light image detector 330 captures invisible images in a 600× 400 pixel array, a correspondence may be determined by factoring the array ratios against the coordinate values. As such, visible light image coordinate location 160, 120 may be scaled by the array ratios (e.g., 160*(600/1600) and 120* (400/1200)) to find the coordinate location of 60, 40 of the corresponding pixel in the invisible light image.

It may be appreciated that data for visible and invisible light images may be retrieved directly from the pixilated visible light image detector 320 and the pixilated invisible light image detector 330 respectively, or from digital images captured by two pixilated image detectors 320, 330 and stored in digital data storage 311.

In the image handler 300, the image blender 230 can create an improved image by combining visible light image data and invisible light image data because an improvement in the lighting of the scene-to-be-imaged results from frontal illumination with invisible light in combination with environmental illumination with visible light. It may be appreciated that the improvement may be due to a variety of factors such as, for example, an illumination of the scene with less undesired shadows and/or an illumination of the scene with less specular reflection in invisible spectrum than in the visible spectrum.

Figure 4:
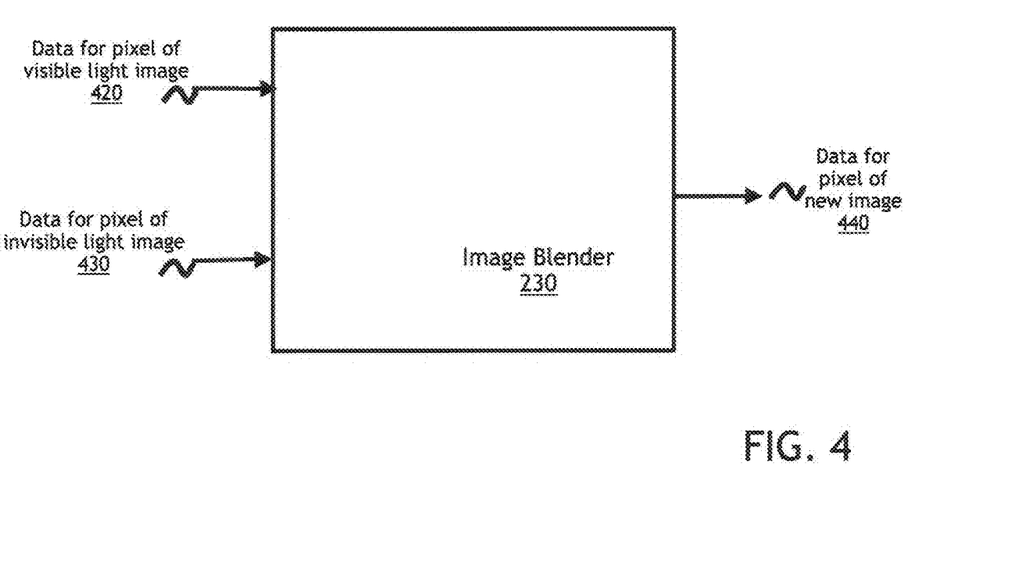
FIG. 4 is a flow chart schematically illustrating one embodiment of a method for creating an improved image, e.g., using the image blender of FIGS. 2-3.

FIG. 4 schematically illustrates the functional flow of an exemplary image blending performed by the image blender 230 in FIGS. 2-3. The image blender 230 processes the data 420 for a pixel of the visible light image with the data 430 for a corresponding pixel of the invisible light image to create the new data 440 for a pixel of the new image. For example, RGB information for a pixel of a visible light image may be modified by intensity information for a corresponding pixel of an invisible light image to create new RGB information for that pixel of the new image.

In the image blender 230, the image blending program 354 may utilize any suitable algorithm to blend the data 420, 430 for the corresponding pixels in the visible and invisible light images to form the new data 440 for that pixel of the new image.

In a first embodiment, new pixel data 440 for a pixel is formed by blending color pixel data 420 for the pixel of the visible light image, in a YUV color model, with intensity pixel data 430 for the corresponding pixel of the invisible light image. For example, the color pixel data 420 may be the values of y, u and v and the intensity pixel data 430 may be an intensity value i. Then, the image blender 230 blends this data for the corresponding pair of pixels as shown in equations (1)-(3) to form new pixel data 440, i.e., y', u' and v', for the pixel.

$$y'=F(i,y) \quad (1)$$

$$u'=f(i,u) \quad (2)$$

$$v'=f(i,v) \quad (3)$$

It may be appreciated that F( ) and f( ) functions may be different. For example, F( ) may equate the new luma information with the original intensity information (e.g., y'=i), and f( ) may equate the new chrominance information with the original chrominance information (e.g., u'=u and v'=v).

In a second embodiment, new pixel data 440 for a pixel may be formed by blending color pixel data 420 for a pixel of the visible light image, in an RGB color model, with intensity pixel data 430 for the corresponding pixel of the invisible light image. For example, the color pixel data 420 may be a set of intensity values of red (r), green (g), and blue (b) light of the pixel of the visible light image and intensity pixel data 430 may be an intensity value (i) of the corresponding pixel of the invisible light image. In such an embodiment, the image blender 230 blends the corresponding pixel data as shown in equations (4)-(6) to form new pixel data 440 for the pixel with values r', g' and b'.

$$r'=i*r/(r+g+b) \quad (4)$$

$$g'=i*g/(r+g+b) \quad (5)$$

$$b'=i*b/(r+g+b) \quad (6)$$

It may be appreciated that in additive color models such as RGB, where the intensity information is mixed with the chrominance information, the blending of the target color with one or more of the other colors may provide some normalization of the target color with intensity (e.g., using (r+g+b) as shown in equations (4)-(6)).

In a third and fourth embodiment, a more pleasing image may be generated by mixing a portion of the original color pixel data 420 (e.g., y, u, v as shown above in equations (1)-(3) and r, g, b as shown above in equations (4)-(6)) into the synthetically improved new pixel data (e.g., y', u', v' as shown above in equations (1)-(3) and r', g', b' as shown above in equations (4)-(6)) disclosed above. That is, new pixel data 440 for an image pixel may be formed as shown in equations (7)-(12), where alpha represents a mixing constant. This resultant new pixel data 440 for the new image pixel may be more pleasing, because the final new image appears to be lit by several light sources (e.g., front and above), in a similar way to professional lighting set-ups.

In the third embodiment, which is a further embodiment of the first embodiment, the image blender 230 further blends the data of a pair of corresponding pixels of the visible and invisible light images as shown in equations (7)-(9) to form new pixel data 440 for the pixel with values Y, U and V.

$$Y=alpha*y+(1-alpha)*y' \quad (7)$$

$$U=u' \quad (8)$$

$$V=v' \quad (9)$$

In the fourth embodiment, which is a further embodiment of the second embodiment, the image blender 230 further blends the data of a pair of corresponding pixels of the visible and invisible light images as shown in equations (10)-(12) to form new pixel data 440 for the pixel with values R, G and B. In other embodiments, alpha may be replaced by a different mixing constant for each color (e.g., an alpha mixing constant for R, a beta mixing constant for G and a gamma mixing constant for B; for example ITU-R 601 specifies coefficients for determining intensity values from RGB data).

$$R=alpha*r+(1-alpha)*r' \quad (10)$$

$$G=alpha*g+(1-alpha)*g' \quad (11)$$

$$B=alpha*b+(1-alpha)*b' \quad (12)$$

Color improvement may be subjective and may also depend on the brightness of the invisible light source (e.g., 120 of FIG. 1) relative to the visible light of the environment of the scene-being-imaged.

In some embodiments, using an alpha in the range of 0.1 and 0.3 provided the best range of color improvement of the resultant new pixel data 440 over the original visible light pixel data 420 and an alpha near 0.2 provided optimal color improvement of the resultant new pixel data 440 over the original visible light pixel data 420.

In some embodiments, the image blender 300 may use different algorithms or mixing constants for different color pixel data and intensity pixel data combinations. For example, since the intensity value in an intensity pixel may be strongest in foreground pixels, the image blender 230 may place varying blending weights on the intensity pixel data (e.g., to focus on enhancing foreground images and/or to address a shadow effect caused by an obstruction of the invisible light source).

It may be appreciated that pixels may be blended in any suitable way, for example, on a pixel-by-pixel basis or on a block basis. It may be further appreciated that although discussed herein with regard to YUV and RGB color models, any suitable color model may be used by the image blender 230.

Figure 5:
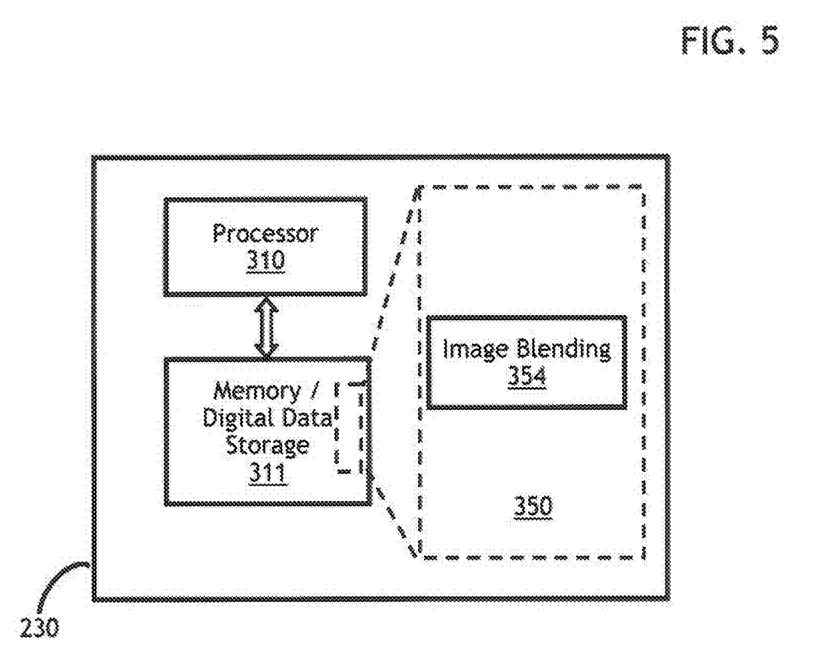
FIG. 5 schematically illustrates the image blender of the image handler of FIG. 3.

FIG. 5 schematically illustrates the image blender 230 of the image handler 300 of FIGS. 2-3. The image blender 300 includes a processor 510 and digital data storage 511.

The processor 310 cooperates with digital data storage 311 to control the operation of image blender 300 (e.g., to execute the image blending program 354 to blend image data).

Figure 6:
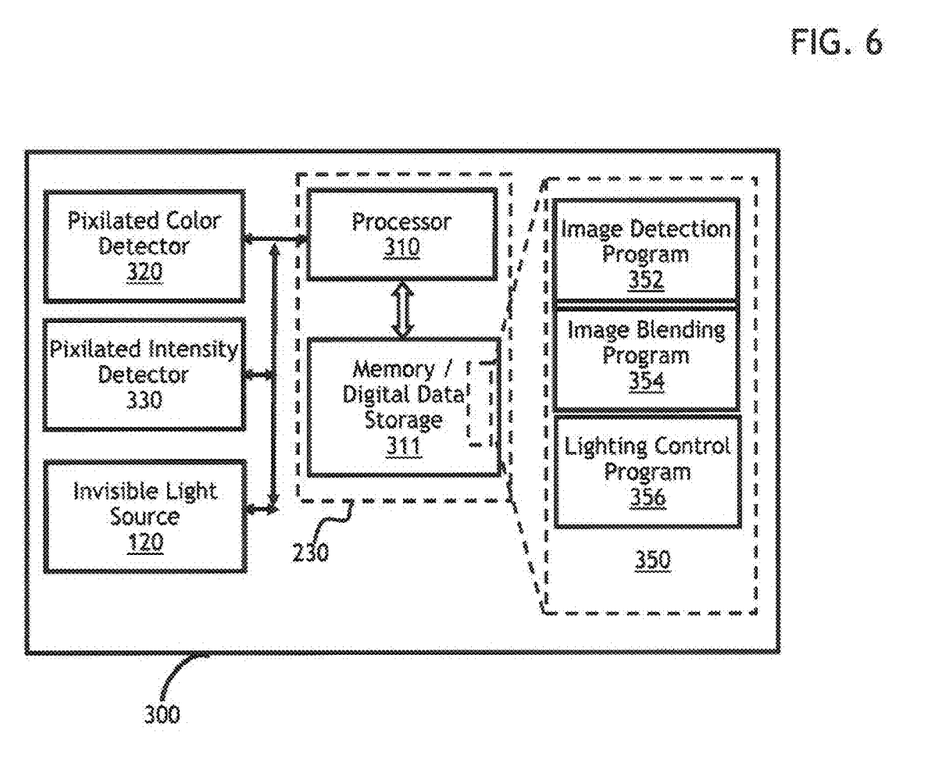
FIG. 6 schematically illustrates a further embodiment of the camera of FIG. 1.

FIG. 6 schematically illustrates a further embodiment 300 of the image handler of FIG. 3. In the image handler 300, the digital data storage 311 further includes a lighting control program 356 that is executable by the processor 310. The processor 310 can execute the lighting control program 356 to control the invisible light source 120.

Invisible light source 120 illuminates the scene-being-imaged with an invisible light that is detectable by the pixilated invisible light image detector 330. It may be appreciated that invisible light source 120 may also emit light at multiple and differing wavelengths. For example, the invisible light source 120 may use multiple sources to illuminate the scene-being imaged from different directions, and the pixilated invisible light image detector may include intensity detectors at different frequencies to separately image the invisible light of the different sources (e.g., UV light and IR light, or two wavelengths of IR light). In such a multiple source configuration, the image handler 300 may advantageously adjust the lighting balance of an image by executing the lighting control program 356 with the processor 310 (e.g., between say front and rear-highlighting).

In one embodiment, invisible light source 120 may be internal to the image handler 300.

In other embodiments, invisible light source 120 may be external to image handler 300 and controlled via any suitable communication path (e.g., Bluetooth, USB, firewire, or any suitable communication path).

It may be appreciated that by controlling, invisible light source 120, the processor 310 may operate the lighting control program 356 to, for example: (1) activate (turn on) and deactivate (turn off), invisible light source 120 (e.g., to enable the same functionality of a flash in a conventional digital camera); (2) positionally adjust invisible light source 120 (e.g., to direct invisible light at different image objects (e.g., during a video conference call with multiple attendees)); (3) direct invisible light at an focal point in the scene-being-imaged based on the positioning of environmental lighting (e.g., to address shadow area(s)); and/or (4) configure invisible light source 120 (e.g., to control any suitable parameters such as for example, wavelength and/or timers).

Figure 7:
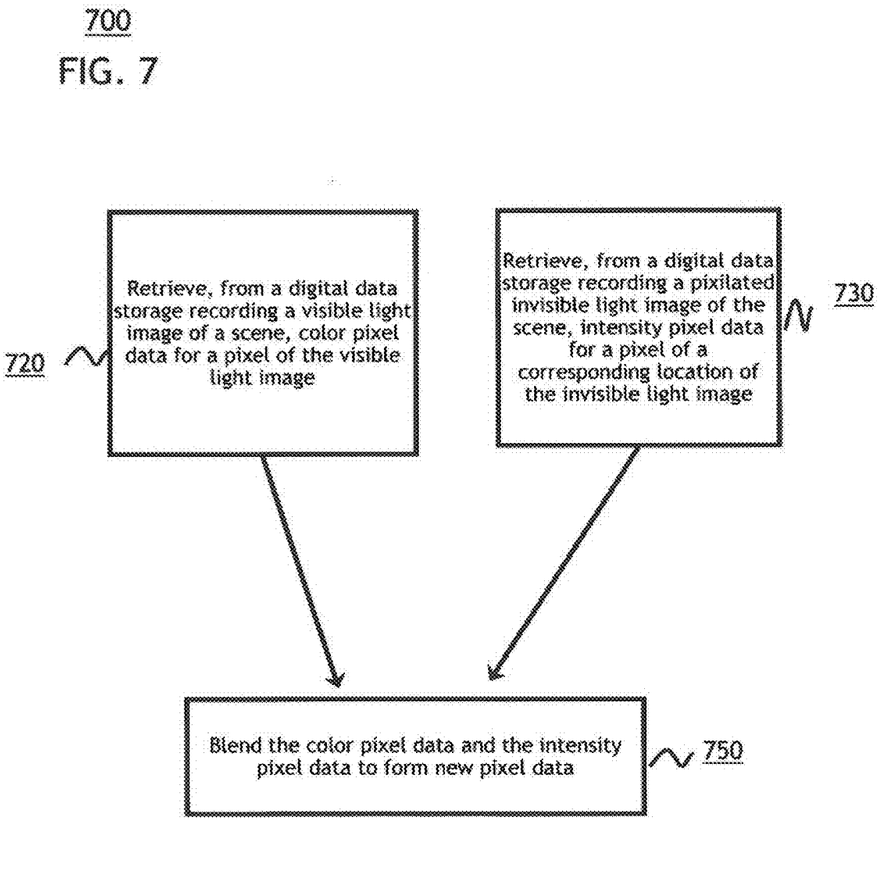
FIG. 7 is a flow chart illustrating a method for creating an improved image, e.g., using the image blenders of FIGS. 2-6.

FIG. 7 depicts one embodiment of a method 700 for creating an improved image, e.g., using the image blenders 230 of FIGS. 2, 3, and 5-6.

At step 720, the method 700 includes retrieving color pixel data for a targeted pixel of the visible light image, e.g., the visible light image 210 of FIG. 2. The retrieval step 720 may be performed by the processor 310 in cooperation with digital data storage 311 while executing the image blending program 354.

At step 730, the method 700 includes retrieving intensity pixel data for a pixel of the invisible light image, e.g., the invisible light image 220 of FIG. 2, wherein the pixel of the invisible light image is at the image location corresponding to that of the targeted pixel of the visible light image. The retrieval step 730 may be performed by the processor 310 in cooperation with digital data storage 311 while executing the image blending program 354.

It may be appreciated that if color pixel data and intensity pixel data are co-located in the same pixel as in the "RGBI" color model, then they may be retrieved together.

At step 750, the method 700 includes blending the color pixel data for the targeted pixel and the intensity pixel data for the corresponding pixel of the invisible light image to form new pixel data for the targeted pixel. The blending step 730 may be performed by the processor 310 in cooperation with digital data storage 311 while executing the image blending program 354.

Typically, the method 700 includes repeating steps 720, 730, and 750 for each of the pixels of the visible light image 210, i.e., to produce new pixel data for the entire visible light image. That is, the method 700 typically produces new pixel data for all of the pixels of a new image, e.g., the new image 240 of FIG. 2.

In some embodiments, only a subset of the visible light image pixels will be blended with their corresponding invisible light image pixels (e.g., in a video capture system, it may be advantageous not to blend all of the pixels of the respective visible light and invisible light images in order to decrease processor load and latency). It will be appreciated that the subset may be determined by: comparing the intensity value of the color pixel data against the corresponding intensity value of the intensity pixel data; determining whether the magnitude of the intensity value of the color pixel data indicates a defect area (e.g., glare or shadow); comparing chrominance and intensity values of the pixel data (e.g., a pixel with black chrominance may not require correction); identifying and focusing on objects (e.g., individuals in a video conference as opposed to the background); storing a history (e.g., in a video conference, a history of prior frames may indicate problems areas that require blending) and/or the like.

Figure 8:
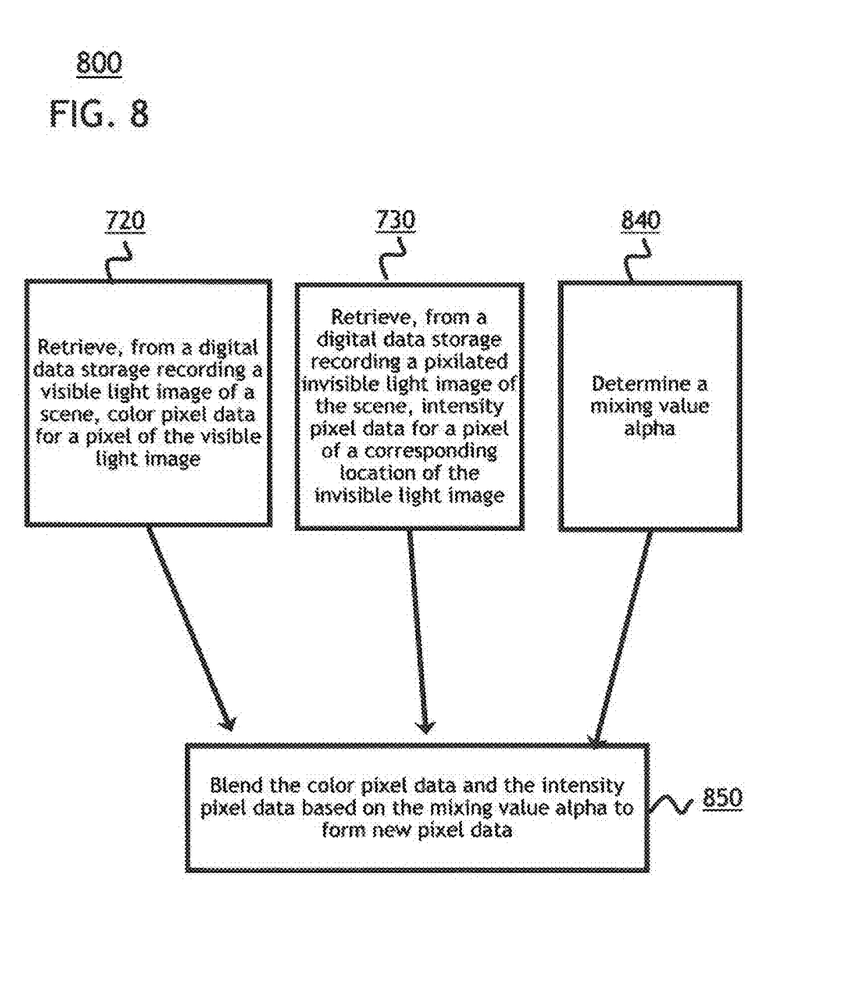
FIG. 8 is a flow chart illustrating a specific method for creating an improved image according to the method of FIG. 7.

FIG. 8 depicts a specific embodiment 800 of FIG. 7 of the method 700 of FIG. 7.

The method 800 includes performing the retrieving steps 720, 730 as described with respect to the method 700 of FIG. 7.

The method 800 involves performing a blending step 850 that is a specific embodiment of the blending step 750 of FIG. 7.

At step 840, the processor in cooperation with data storage determines a mixing value alpha.

At the blending step 850, the color pixel data of a pixel of the visible light image is blended with the intensity pixel data of a corresponding pixel of the invisible light image based on a mixing value alpha to form new pixel data for the pixel of the new image. Thus, the blending step 850 makes the intensity value of the new pixel data to be a blend of both the intensity value for the color pixel data of the pixel of the visible light image and the intensity pixel data of the corresponding pixel of the invisible light image.

For example, the color pixel data for the pixels of the visible light image 210 may include first chrominance data (e.g., the UV component of visible light pixel data modeled in a YUV color model) and first intensity data (e.g., the Y component of visible light pixel data modeled in a YUV color model) and the intensity pixel data for the corresponding pixels of the invisible light image 220 may include second intensity data. Then, the blending step 850 may produce, e.g., intensity data of the new pixel data for a pixel of the new image 240 that blends the first intensity data and the second intensity data based on the mixing value alpha, e.g., as described in the above algorithm(s) for the image blending program 354.

For example, referring to above equations (1) and (7), the mixing value alpha determines the proportion of blending between the original intensity value of the color pixel data (e.g., "y" in equations (1) and (7)) and the resultant intensity value from equation (1) (e.g., "y'" in equations (1) and (7)). It may be appreciated that the resultant intensity value "y'" in equations (1) is based on the intensity value of the intensity pixel data (e.g., "i" in equation (1)).

Mixing value alpha may be determined using any suitable method such as, for example: (1) being a fixed constant configured by the system and/or user; (2) shifting the weighting based on whether the pixel location is in the foreground or background; and/or (3) shifting the weighting based on a comparison of the intensity values of the visible light pixel data and invisible light pixel data (e.g., a low intensity value may indicate a shadow area).

Figure 9:
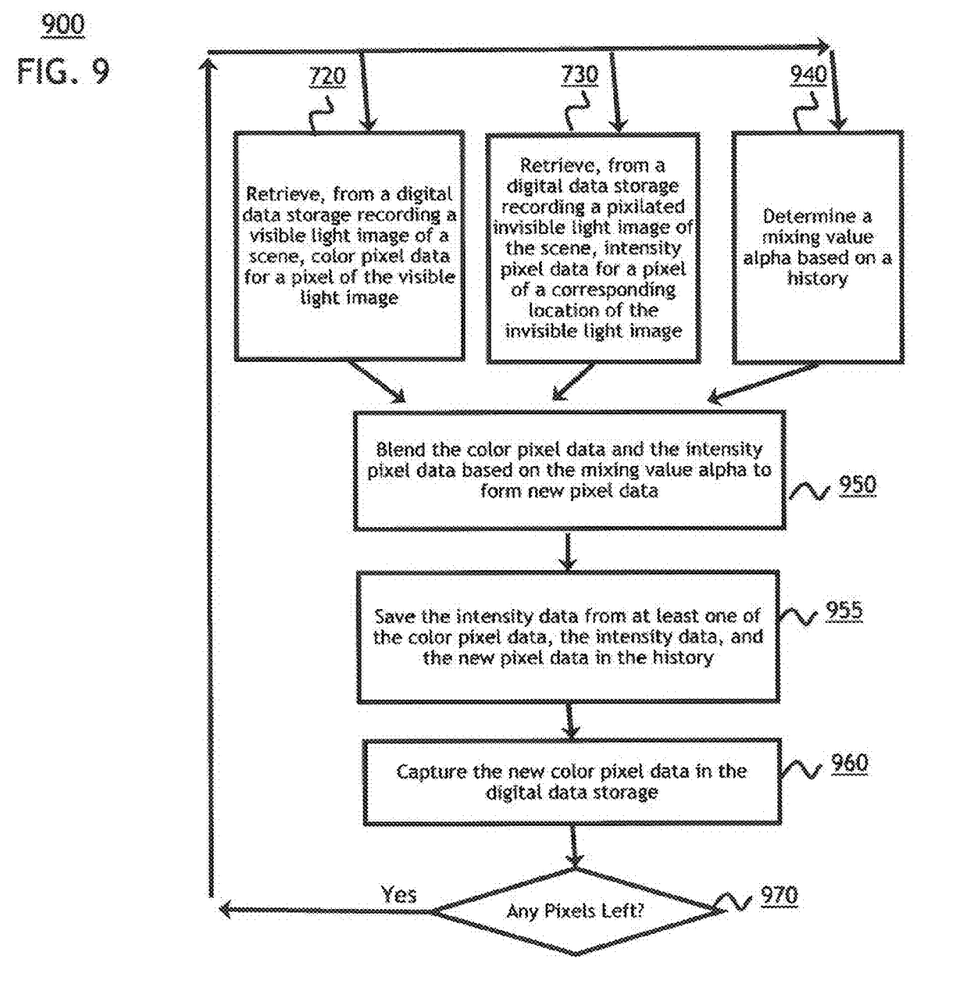
FIG. 9 is a flow chart illustrating another specific method for creating an improved image according to the method of FIG. 7.

FIG. 9 depicts a specific embodiment 900 of the method 700 of FIG. 7.

The method 900 performs retrieval steps 720 and 730 as described with respect to the method 700 of FIG. 7.

The method 900 performs the steps 940, 950, 955, and 960 to perform the step 750 of FIG. 7.

At step 940, the method 900 includes determining a mixing value alpha for the target pixel of the visible light image, e.g., while the processor 310 operates the image blending program 354. In some embodiments, mixing value alpha is a function of a history of intensity values for the target pixel as previously stored. For example, an abrupt darkening of pixels from neighboring pixels may signify that a pixel is within a shadow area and that the mixing value alpha should be adjusted.

At step 955, the method 900 involves storing the intensity value of the color pixel data for the target pixel of the visible light image 210, the intensity data for the corresponding pixel of the invisible light image 220, and/or the intensity value of the new pixel data in a history for the target pixel of the visible light image. For example, the storing step 955 may be performed by the processor 310 while executing the image blending program 354, which is stored in the digital data storage 311. In some embodiments, the history may include a subset, or a sampling, of the sequential intensity values of the retrieved pixels of the visible light image (i.e., not all retrieved coordinate locations of pixels may have a value stored in the history).

In a further embodiment, the sampling of step 955 is based on a determination that the image data at a pixel location contains relevant information (e.g., the intensity value of the pixel may be very different from the intensity values of neighboring pixels). In some embodiments, the processor 310 may retrieve intensity values from the color pixel data of a block of neighboring pixels of the visible light image 210 and the intensity data from a block of neighboring pixels of the invisible light image 220 and base the determination of the mixing value alpha on such "block characteristics" of the intensity values.

At step 960, the method involves storing the new pixel data produced by the blending step 950 in a digital data storage, e.g., the digital data storage 311. It may be appreciated that new pixel data may replace the retrieved color pixel data in the same pixel or be used to form a new pixel data for a pixel of a separately stored new image.

At step 970, the method 900 involves determining whether there are pixels of the visible light image 210 remaining in the retrieved image and not yet blended with their corresponding pixels of the invisible light image 220. If such color pixels remain, the method returns to step 720. Otherwise, the method 900 stops.

Although primarily depicted and described in a particular sequence, it may be appreciated that the steps shown in methods 700, 800 and 900 may be performed in any suitable sequence. Moreover, the steps identified by one box may also be performed in more than one place in the sequence. For example, Saving Intensity History step 935 might be applied during and/or at the output of various steps of method 900 such as, for example, steps 940, 950, 960 or 970.

Although primarily depicted and described with respect to components in FIG. 3, it may be appreciated that any suitable components may be used to perform the steps shown in methods 700, 800 and 900 whether or not they are depicted and described in FIG. 3.

It may be appreciated that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

Although depicted and described herein with respect to embodiments in which, for example, programs and logic are stored within the digital data storage and the memory is communicatively connected to the processor, it may be appreciated that such information may be stored in any other suitable manner (e.g., using any suitable number of memory(s), storage(s) or database(s)); using any suitable arrangement of memory(s), storage(s) or database(s) communicatively coupled to any suitable arrangement of devices; storing information in any suitable combination of internal or external memory(s), storage(s) and/or database(s); or using any suitable number of accessible external memory(s), storage(s) and/or database(s). As such, the term digital data storage referred to herein is meant to encompass all suitable combinations of memory(s), storage(s) and/or database(s). For example, visible light image 210 in FIG. 2 and invisible light image 220 in FIG. 2 may be stored in separate digital data storage locations. Moreover, programs 350 in FIG. 3 may be stored in a separate digital data storage location from visible light image 210 in FIG. 2 and invisible light image 220 in FIG. 2 (e.g., program 350 running on a local machine accessing networked storage to retrieve visible light image 210 in FIG. 2 and invisible light image 220 in FIG. 2.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the Figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It may be appreciated that any block diagrams herein represent conceptual views of illustrative circuitry embodying the principles of the invention. Similarly, it may be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus, comprising:
   digital data storage; and
   a processor configured to:
   retrieve color pixel data for a pixel of a visible light image of a scene, the visible light image stored in the digital data storage;
   retrieve intensity pixel data for a pixel from a corresponding location of an invisible light image of the scene, the invisible light image stored in the digital data storage; and
   blend the color pixel data and the intensity pixel data to form new pixel data for a new image of the scene;
   wherein the color pixel data comprises first chrominance data and first intensity data; the intensity pixel data comprises second intensity data; and the new pixel data comprises second chrominance data and third intensity data; wherein the act of blending produces the second chrominance data based on the first chrominance data and produces the third intensity data based on the second intensity data;
   wherein the first chrominance data and the first intensity data are mixed in the color pixel data to form a first color intensity value and one or more second color intensity values, the first color intensity value representing a first color component and the one or more second color intensity values representing one or more corresponding second color components; and
   wherein the blending of the color pixel data and the intensity pixel data comprises using a blending function to form a new first color intensity value representing the first color component, the blending function comprising the second intensity data and a ratio between a first expression comprising the first color intensity value and a second expression comprising the first color intensity value and the one or more second color intensity values.

2. The apparatus of claim 1, wherein the color pixel data is an additive color model.

3. The apparatus of claim 1, wherein the blending function is $r'=i*r/(r+g+b)$, wherein $r'$ is a data value defining the new first color intensity value, $r$ is a data value defining the first color intensity value, $g$ and $b$ are data values defining the at least one other color, and $i$ is a data value defining the second intensity value.

4. The apparatus of claim 1 wherein the act of blending further comprises producing the third intensity data based on mixing the first color intensity value and the second intensity data based on a mixing value alpha.

5. The apparatus of claim 4, wherein the color pixel data is based on an additive color model and the act of blending comprises using $R=alpha*r+(1-alpha)*r'$, wherein $R$ is a data value defining a new target color intensity value representing the first color component, the new target color intensity value comprising the blended third intensity data, $r'$ is a data value defining the new first color intensity value, $r$ is a data value defining the first color intensity value, and alpha is a data value defining the mixing value alpha.

6. The apparatus of claim 4, wherein the act of blending comprises using $Y=alpha*y+(1-alpha)*y'$, wherein $Y$ is a data value defining the third intensity data, $y$ is a data value defining the first intensity data, $y'$ is a data value defining the second intensity data, and alpha is a data value defining the mixing value alpha.

7. An apparatus, comprising:
   a pixilated visible light image detector configured to record color pixel data for a plurality of pixels representing a visible light image of a scene from visible light received from the scene;
   a pixilated invisible light image detector configured to record intensity pixel data for a plurality of pixels representing an invisible light image of the scene from invisible light received from the scene;
   an image blender configured to digitally produce new pixel data for a plurality of pixels representing a new image of the scene by blending the color pixel data from at least one of the plurality of pixels representing the visible light image and the intensity pixel data from a corresponding location of the invisible light image;
   wherein the color pixel data comprises first chrominance data and first intensity data; the intensity pixel data comprises second intensity data; and the new pixel data comprises second chrominance data and third intensity data; wherein the act of blending produces the second chrominance data based on the first chrominance data and produces the third intensity data based on the second intensity data;
   wherein the first chrominance data and the first intensity data are mixed in the color pixel data to form a first color intensity value and one or more second color intensity values, the first color intensity value representing a first color component and the one or more second color intensity values representing one or more corresponding second color; and
   wherein the blending of the color pixel data and the intensity pixel data comprises using a blending function to form a new first color intensity value representing the first color component, the blending function comprising the second intensity data and a ratio between a first expression comprising the first color intensity value and a second expression comprising the first color intensity value and the one or more second color intensity values.

8. The apparatus of claim 7, further comprising an invisible light source, and wherein the pixilated invisible light image detector is sensitive to light at the wavelength of the invisible light source.

9. The apparatus of claim 8, wherein the invisible light source produces invisible light at an infrared or near infrared wavelength.

10. The apparatus of claim 8, further comprising a processor configured to perform at least one of:
   activate the invisible light source;
   deactivate the invisible light source;
   positionally adjusting the invisible light source; and
   configure the invisible light source.

11. The apparatus of claim 10, wherein the invisible light source comprises a first invisible light source having a first wavelength and a second invisible light source having a second wavelength.

12. The apparatus of claim 7, wherein the pixilated visible light image detector and the pixilated invisible light image detector have different numbers of pixels.

13. A method, comprising:
   retrieving from a digital data storage recording a visible light image of a scene, color pixel data for a pixel of the visible light image;
   retrieving from a digital data storage recording a pixilated invisible light image of the scene, intensity pixel data for a pixel of a corresponding location of the invisible light image;
   blending the color pixel data and the intensity pixel data to form new pixel data;
   wherein the color pixel data comprises first chrominance data and first intensity data; the intensity pixel data comprises second intensity data; and the new pixel data comprises second chrominance data and third intensity data; wherein the act of blending produces the second chrominance data based on the first chrominance data and produces the third intensity data based on the second intensity data;
   wherein the first chrominance data and the first intensity data are mixed in the color pixel data to form a first color intensity value and one or more second color intensity values, the first color intensity value representing a first color component and the one or more second color intensity values representing one or more corresponding second color; and
   wherein the blending of the color pixel data and the intensity pixel data comprises using a blending function to form a new first color intensity value representing the first color component, the blending function comprising the second intensity data and a ratio between a first expression comprising the first color intensity value and a second expression comprising the first color intensity value and the one or more second color intensity values.

14. The method of claim 13, wherein the act of blending produces the third intensity data based on the first intensity data and the second intensity data.

15. The method of claim 14, wherein the act of blending produces the third intensity data based on mixing the first intensity data and the second intensity data according to a mixing value alpha.

16. The method of claim 15, wherein the mixing value alpha is based on at least one of:
   a configuration parameter;
   a location of the color pixel data; and
   a comparison between the first intensity data and the second intensity data.

17. The method of claim 15, further comprising saving at least one of the first intensity data, the second intensity data, and the third intensity data in a history, wherein the mixing value alpha is determined based on the history.

18. The method of claim 13, further comprising storing the new pixel data in the digital data storage.

19. A method of claim 13, further comprising:
   forming the color pixel data and the intensity pixel data by recording the visible light image of the scene in a first array-type light detector and by recording the invisible light image of the scene in a second array-type light detector.

* * * * *